US011789990B1

(12) United States Patent
Fouad et al.

(10) Patent No.: US 11,789,990 B1
(45) Date of Patent: Oct. 17, 2023

(54) AUTOMATED SPLITTING OF DOCUMENT PACKAGES AND IDENTIFICATION OF RELEVANT DOCUMENTS

(71) Applicant: IRON MOUNTAIN INCORPORATED, Boston, MA (US)

(72) Inventors: Meena AbdelMaseeh Adly Fouad, Mississauga (CA); Zhihong Zeng, Acton, MA (US); Anirudh Prabakaran, Atlanta, GA (US); Samriddhi Shakya, Washington, DC (US); Tom Sebastian, Bangalore (IN); Tallam Sai Teja, Andhra Pradesh (IN); Simon Ioffe, Boston, MA (US); Narasimha Goli, Boston, MA (US)

(73) Assignee: Iron Mountain Incorporated, Boston, MA (US)

( * ) Notice: Subject to any disclaimer, the term of this patent is extended or adjusted under 35 U.S.C. 154(b) by 0 days.

(21) Appl. No.: 17/733,581

(22) Filed: Apr. 29, 2022

(51) Int. Cl.
  *G06F 16/30* (2019.01)
  *G06F 16/35* (2019.01)
  *G06V 30/416* (2022.01)
  *G06F 16/383* (2019.01)
  *G06N 3/045* (2023.01)

(52) U.S. Cl.
  CPC .......... *G06F 16/35* (2019.01); *G06F 16/383* (2019.01); *G06N 3/045* (2023.01); *G06V 30/416* (2022.01)

(58) Field of Classification Search
  CPC ..... G06F 16/35; G06F 16/383; G06V 30/416; G06N 3/045
  See application file for complete search history.

(56) References Cited

U.S. PATENT DOCUMENTS

| 6,037,941 | A | * | 3/2000 | Goto | G06F 3/0483 |
| | | | | | 715/777 |
| 2005/0040642 | A1 | * | 2/2005 | Jiang | B42F 21/00 |
| | | | | | 283/81 |
| 2007/0127077 | A1 | * | 6/2007 | Tamura | H04N 1/32144 |
| | | | | | 358/540 |
| 2009/0222759 | A1 | * | 9/2009 | Drieschner | G06F 16/951 |
| | | | | | 715/780 |
| 2011/0137898 | A1 | * | 6/2011 | Gordo | G06F 16/93 |
| | | | | | 707/E17.089 |
| 2016/0352772 | A1 | * | 12/2016 | O'Connor | H04L 63/1483 |
| 2022/0138259 | A1 | * | 5/2022 | Puzder | G06V 30/416 |
| | | | | | 707/738 |

* cited by examiner

*Primary Examiner* — Mahesh H Dwivedi
(74) *Attorney, Agent, or Firm* — Kilpatrick Townsend & Stockton LLP (57) ABSTRACT

A process for document processing (e.g., automated package splitting) may involve producing, for each document page of an ordered plurality of document pages, an image of the document page and a representation of text from the document page; generating, for each document page of the ordered plurality, and based on the image of the document page and the representation of text from the document page, an embedding of the document page; and generating, for each document page among a subset of the ordered plurality, a label for the document page that indicates whether the document page is a document first page, based on the embedding of the document page, the embedding of each of at least one document page that precedes the document page in the ordered plurality, and the embedding of each of at least one document page that follows the document page in the ordered plurality.

20 Claims, 8 Drawing Sheets

AUTOMATED SPLITTING OF DOCUMENT PACKAGES AND IDENTIFICATION OF RELEVANT DOCUMENTS

TECHNICAL FIELD

The field of the present disclosure relates to document processing. More specifically, the present disclosure relates to techniques for processing of document packages and identification of relevant documents from the document packages.

BACKGROUND

Many types of tasks (e.g., for business, for archiving, etc.) may involve processing of a collection of documents. In some cases, the collection of documents may be presented digitally as a multi-page file or stream (a "document package") that contains no indication of which pages in the package are associated with each of the various documents in the collection. A document package may contain multiple documents that are relevant to the task and may also contain one or more documents that are not relevant to the task.

SUMMARY

Certain embodiments involve techniques for document package processing. For example, a process may involve producing, for each document page of an ordered plurality of document pages, an image of the document page and a representation of text from the document page. The process may also involve generating, for each document page of the ordered plurality, and based on the image of the document page and the representation of text from the document page, an embedding of the document page. The process may also involve generating, for each document page among a subset of the ordered plurality, a label for the document page that indicates whether the document page is a document first page, based on the embedding of the document page, the embedding of each of at least one document page that precedes the document page in the ordered plurality, and the embedding of each of at least one document page that follows the document page in the ordered plurality.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The subject matter of embodiments of the present disclosure is described here with specificity to meet statutory requirements, but this description is not necessarily intended to limit the scope of the claims. The claimed subject matter may be implemented in other ways, may include different elements or steps, and may be used in conjunction with other existing or future technologies. This description should not be interpreted as implying any particular order or arrangement among or between various acts or elements except when the order of individual acts or arrangement of elements is explicitly described.

Many different types of tasks (e.g., business, legal, archiving, etc.) may involve the processing of a collection of documents. Examples of such tasks may include, for example, processing a mortgage, processing an insurance claim, applying for regulatory (e.g., FDA) approval, etc. In such a task, the collection of documents may be received digitally as a multi-page file or a stream of scanned pages, and a collection of documents in such form is hereinafter referred to as a "document package." A document package might typically include (by way of example and not as a limitation) fifty to seventy documents. A document package is an ordered plurality of document pages, and the term "ordered plurality of document pages" is used herein to refer to a contiguous portion (and possibly all) of a document package.

Documents might be collected together for creation of a corresponding document package for many reasons: for example, maximizing storage and/or logistical efficiency, optimizing digital archiving, or legacy reasons (e.g., incorporating paper documents into a digital process). Identification of relevant documents from a document package may be important to enable multiple processing workflows, which may include, for example, dispatching each relevant document to the right recipient (or distributing relevant documents among teams), document indexing, further manual analysis and/or processing, or processing by one or more automated systems. Examples of entities that perform processing of document packages may include any of the following: content service platform software providers, enterprises interested in automating digital and paper workflows, digital and physical archiving solutions providers, or internet services entities that provide automated decisions based on uploaded document packages.

In some cases, it may be desired or necessary to process (e.g., to parse) a document package before submitting it to a task or workflow. For example, a document package may contain no indication of which pages in the package are associated with each of the various documents in the collection. Additionally or alternatively, a document package may contain multiple documents that are relevant to the task and may also contain one or more documents that are not relevant to the task.

In some cases, it may be impracticable to rely on one or more human reviewers to parse a document package into its component documents and/or to separate relevant documents within a document package from document that are not relevant. A fully automated internet-based quotation system relying on customer uploaded documents, for example, may require a faster response that a human can provide. Processing of large volumes and/or high-velocity streams of scanned pages (e.g., for insurance claims processing), for example, may be too labor-intensive to assign to human reviewers. In some cases, processing by humans may be prone to error (for example, processing of a large document package to identify relevant documents for a mortgage closing, demanding long training programs for the human identifiers) and/or may require specialized expertise (for example, if the archived documents are in one or more languages that are unfamiliar to the human identifiers).

Figure 1A:
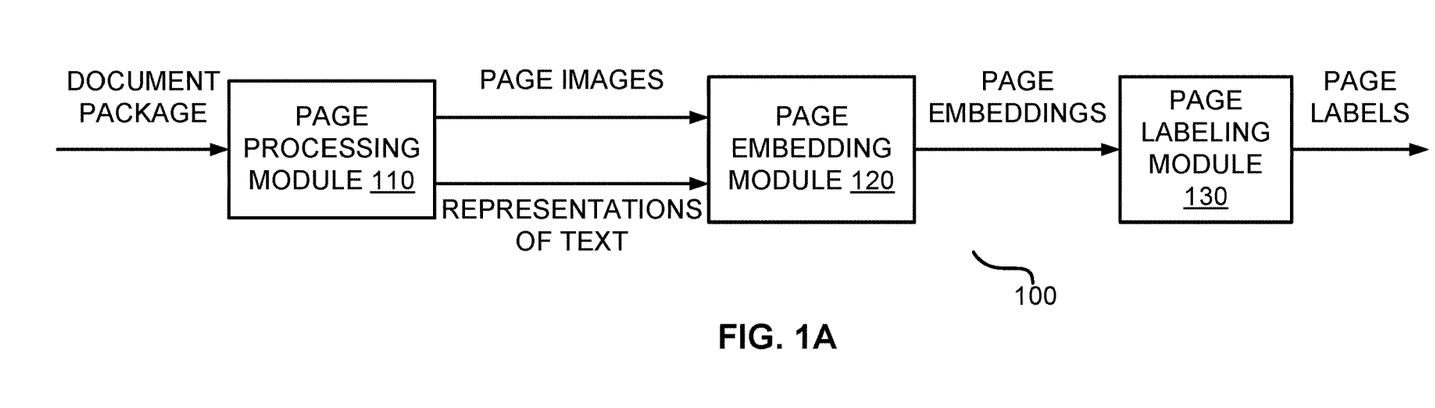
FIG. 1A shows a block diagram of a document package processing system, according to certain aspects of the present disclosure.

FIG. 1A shows a block diagram of a document package processing system 100, according to certain aspects of the present disclosure. As shown in FIG. 1A, the document package processing system 100 includes a page processing module 110 that is configured to process an ordered plurality of document pages (e.g., a document package or portion thereof) to produce corresponding images of document pages ("page images") and representations of text from the document pages. The system 100 also includes a page embedding module 120 that is configured to process the page images and the corresponding representations of text to generate page embeddings. The system 100 also includes a page labeling module 130 that is configured to process the page embeddings to generate page labels for the document pages.

Figure 1B:
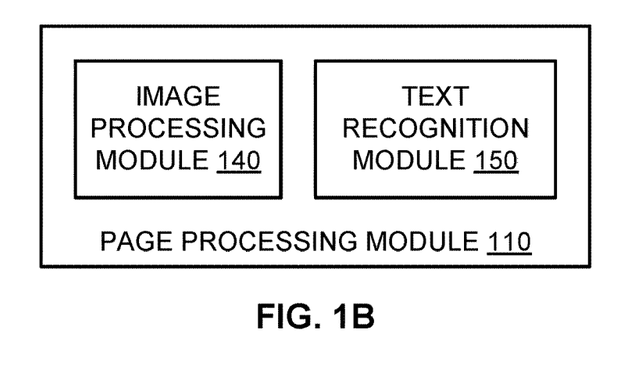
FIG. 1B shows a block diagram of an example of a page processing module, according to certain aspects of the present disclosure.

FIG. 1B shows a block diagram of an example of the page processing module 110, according to certain aspects of the present disclosure, that includes an image processing module 140 and a text recognition module 150. The image processing module 140 is configured to process each page of the ordered plurality of document pages to generate a corresponding page image. The image processing module 140 may include a conversion module (not shown) that is configured to convert digital documents in a document file format (e.g., PDF) into document images in an image file format (e.g., TIFF). For example, the conversion module may be configured to convert each page of a digital document into a corresponding document image. The page processing module 110 may detect that one or more pages of the digital document are already in an image file format (e.g., document images that have been obtained by scanning or otherwise digitizing the pages of paper documents) and may parse such images from the document package as document images.

The image processing module 140 may include a preprocessing module (not shown) that is configured to preprocess document images to produce the plurality of page images. Pre-processing of the document images may include, for example, any of the following operations: de-noising (e.g., Gaussian smoothing), affine transformation (e.g., de-skewing, translation, rotation, and/or scaling), perspective transformation (e.g., warping), normalization (e.g., mean image subtraction), histogram equalization. Pre-processing may include, for example, scaling the document images to a uniform size. In some cases, the text recognition module 120 and the global visual embedding module 210 and the page features embedding module 220 as described below may be configured to accept input images of a particular size (e.g., 640 pixels wide×480 pixels high, 850 pixels wide×1100 pixels high, 1275 pixels wide×1650 pixels high, etc.). It is possible that a document package may include pages that are not document pages; and the image processing module 140 may be configured to identify such pages according to one or more design criteria (e.g., pages that are corrupted, pages that are all white, pages that are all black, etc.) and exclude them from further processing by system 100.

The text recognition module 150 is configured to generate, for each of the page images, a representation of text from the corresponding document page. For example, the text recognition module 150 may be configured to perform optical character recognition (OCR) on each page image to generate the corresponding representation of text. The representation of text from a document page may include a plurality of recognized text units (e.g., words, characters) and may indicate, for each of the plurality of recognized text units, a corresponding position within the document page. For example, the representation of text from a document page may include, for each of the plurality of recognized text units, a bounding box that indicates a corresponding position of the recognized text unit within the document page. A bounding box may be indicated by information sufficient to identify the two-dimensional (2D) coordinates of the four corners of the bounding box within the corresponding document image. In one example, a bounding box is indicated by the 2D coordinates of one corner (e.g., the upper-left corner) together with the width and height of the bounding box (e.g., in pixels). In another example, a bounding box is indicated by the 2D coordinates of two opposite corners of the bounding box (e.g., the upper-left and lower-right corners). In a further example, a bounding box is indicated by the 2D coordinates of the center of the bounding box, together with the width and height of the bounding box (e.g., in pixels, or with each dimension being normalized (e.g., to a 0-1000 scale) relative to the corresponding dimension of the image).

The page embedding module 120 is configured to receive, for each of the plurality of document pages, the corresponding page image and the corresponding representation of text and to generate, based on the page image and representation of text, a corresponding page embedding (e.g., based on embeddings of various page characteristics of the document page). The page embedding module 120 may be implemented as a deep neural network-based page embedder that integrates multiple sources of information to estimate a page embedding as, for example, a feature vector (e.g., a multi-dimensional distributed numerical vectorial representation of the page).

The page embedding module 120 may be configured to process the page image and the corresponding representation of text to extract one or more further page characteristics of the document page (e.g., descriptors, word context, text formatting, page layout, etc. as described below) and to generate an embedding of the document page that is based on the page characteristics. The page embedding module 120 may be implemented to generate each page embedding as a combination of embeddings of page characteristics of the corresponding document page. The page embedding module 120 may be implemented to generate, for each of a plurality of page characteristics of a document page, an embedding (e.g., a vector representation) of the page characteristic, and to combine the embeddings of the page characteristics of the document page to produce a page embedding.

Figure 2:
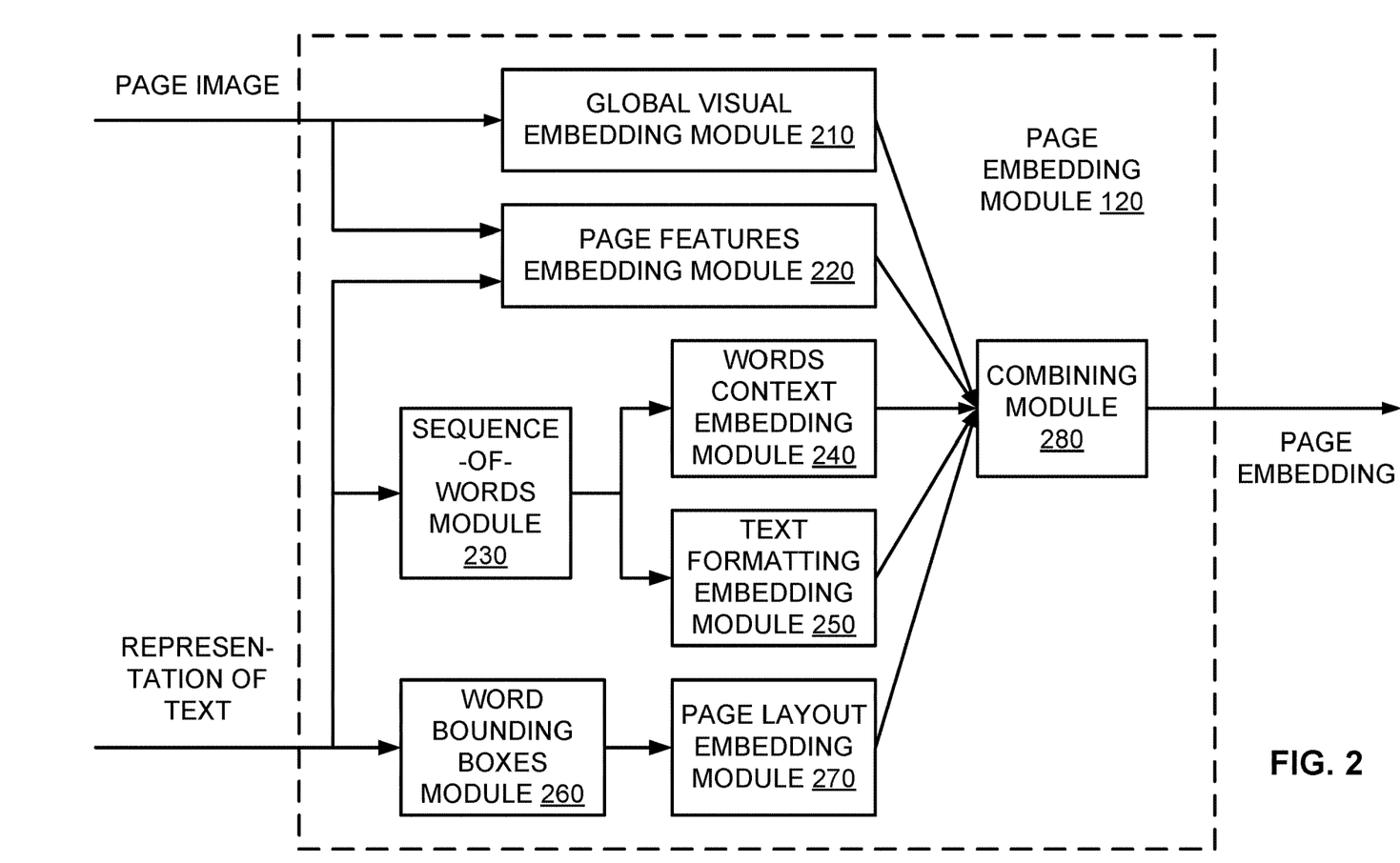
FIG. 2 shows a block diagram of an example of a page embedding module, according to certain aspects of the present disclosure.

FIG. 2 shows a block diagram of an example of the page embedding module 120 according to certain aspects of the present disclosure. In this example, the page embedding module 120 includes a global visual embedding module 210, a page features embedding module 220, a sequence-of-words module 230, a word context embedding module 240, a text formatting embedding module 250, a word bounding boxes module 260, a layout embedding module 270, and a combining module 280. The sequence-of-words module 230 and the word bounding boxes module 260 are configured to process the representation of text from the document page to produce further page characteristics of the document page, and each of the embedding modules 210, 220, 240, 250, and 270 is configured to generate an embedding of a corresponding page characteristic of the document page, e.g. as described in more detail below.

The page image is a page characteristic of the document page that represents the document page as a single image, and the global visual embedding module 210 is configured to generate an embedding of this page characteristic (e.g., an embedding of the page image). The global visual embedding module 210 may be implemented, for example, as a pre-trained two-dimensional (2D) convolutional neural network (e.g., a ResNet), a vision attention-based transformer (ViT), or a combination of the two.

The page features embedding module 220 is configured to process the page image and the corresponding representation of text to extract one or more page features and to generate an embedding of the page features. The one or more page features may include one or more image features extracted from the page image, such as a statistical distribution of pixel values of the page image (e.g., a histogram of a quantized grayscale transformation of the page image). Additionally or alternatively, the one or more page features may include one or more text features extracted from the representation of text (e.g., the number of characters in the page, the number of words in the page). Additionally or alternatively, the one or more page features may include one or more page order features (e.g., the order of the page within the document package). The page features embedding module 220 may be implemented, for example, as a fully connected neural network that may be trained from scratch.

The one or more page characteristics of the document page may include one or more textual characteristics extracted from the representation of text (e.g., a sequence of words, a context of recognized words from the document page, a formatting of text within the document page). The sequence-of-words module 230 is configured to process the representation of text from the document page to produce a page sequence of text. In one example, the sequence-of-words module 230 is configured to produce the page sequence of text by concatenating the recognized text units into a sequence of words.

The word context embedding module 240 is configured to process the page sequence of text to generate an embedding of a context ("context embedding") of recognized words from the document page (e.g., a context embedding of the page sequence of text). The word context embedding module 240 may incorporate a predefined dictionary of words and/or may incorporate computational language modeling. For example, the word context embedding module 240 may be implemented to generate the context embedding using a pre-trained attention-based transformer language model (e.g., a Bidirectional Encoder Representations from Transformers (BERT) language model, such as BERT-base or BERT-large; a Generative Pre-trained Transformer (GPT) model, such as GPT-2 or GPT-3; etc.) or a pre-trained deep bidirectional LSTM model (e.g., an Embeddings from Language Models (ELMo) language model). The context embedding of the page sequence of text may include a context embedding (also called a "contextualized embedding") for each of a plurality of words (possibly each of all of the words) in the page sequence of text.

The representation of text may include words for which a context embedding is not available. For example, the representation of text may include words that are not found within a dictionary, such as, for example, names, phone numbers, or numerical identifiers (e.g., Social Security Numbers (SSNs), Social Insurance Numbers (SINs), etc.). To support the incorporation of information from words that are out-of-dictionary into the page embedding, the text formatting embedding module 250 may be configured to process the representation of text to extract a formatting of text within the document page and to generate an embedding of a formatting of the page sequence of text.

In one example, the text formatting embedding module 250 is configured to produce the text formatting by representing each word of the representation of text as a mapping of each of its individual characters to one of a plurality of predefined character classes, and the mappings may be passed through one or more character neural networks. Examples of predefined character classes may include any of the following: digit, lower-case letter, upper-case letter, symbol. In another example, the plurality of predefined character classes may include any of the following: digit, lower-case letter, upper-case letter, currency symbol, space, hyphen, period, comma, other. The text formatting embedding module 250 may be implemented to generate the embedding using, for example, as a character one-dimensional (1D) CNN that may be trained from scratch.

The plurality of page characteristics of the document page may include a page characteristic that represents the page as a graph of word bounding boxes in the page (e.g., the bounding boxes that surround each of the words in the page). Including information from such a page characteristic in the page embedding may support the incorporation of information relating to the relative locations and sizes of the words in the document page into the page embedding.

In one example, the word bounding boxes module 260 is configured to process the representation of text from the document page to provide a plurality of word bounding boxes for the document page, and the page layout embedding module 270 is configured to process the word bounding boxes for the document page to generate an embedding of a page layout of the document page. The page layout embedding module 270 may be implemented, for example, as a graph neural network.

The combining module 280 is configured to combine embeddings of page characteristics of the document page (e.g., as generated by modules 210, 220, 240, 250, and 270) to generate a page embedding for the document page. The combining module 280 may be configured to perform, for example, one or more of pooling, concatenation, and aggregation of the component embeddings and cross-learning. Pooling of the component embeddings may be performed by taking an element-wise average ("average pooling"), a minimum ("min-pooling"), or a maximum ("max-pooling") of the component embeddings. Aggregation of the component embeddings may be performed by taking a weighted summation of the component embeddings. The combining module 280 may also be configured to perform cross-learning.

The page labeling module 130 is configured to generate a label for each document page that indicates whether the page is the first page of the corresponding document to occur among the ordered pages of the document package ("a document first page") or, alternatively, is a non-first page. In some cases, it is possible that a document page that is labeled by the page labeling module 130 as a document first page is not actually the first page of the corresponding paper document (e.g., for a case in which the pages of the document occur out-of-order in the document package, or for a case in which the actual first page of the document is missing from the document package.)

For each document page, the page labeling module 130 is configured to generate the label based on the embedding of the document page and on the embeddings of multiple other document pages of the ordered plurality of document pages. For each document page that is not the initial or final page of the document package, for example, the page labeling module 130 may generate the label based on the embedding of the document page, on the embeddings of each of at least one document page that precedes the document page in the document package, and on the embeddings of each of at least one document page that follows the document page in the document package. In such cases, the page labeling module 130 may be implemented, for example, as a bidirectional sequence learner.

Figure 3:
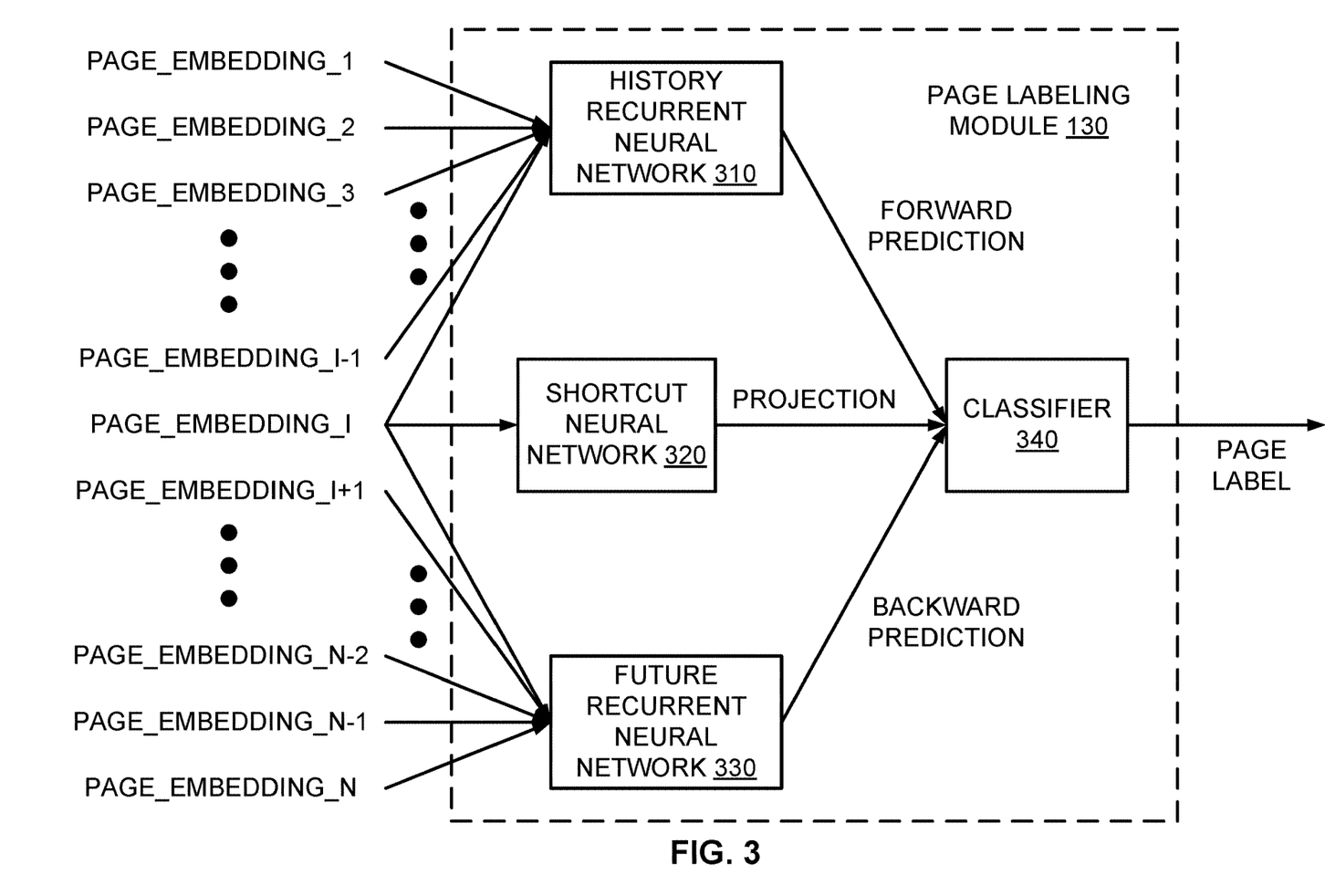
FIG. 3 shows a block diagram of an example of a page labeling module, according to certain aspects of the present disclosure.

FIG. 3 shows a block diagram of an example of the page labeling module 130 according to certain aspects of the present disclosure. In this example, the page labeling module 130 includes a history recurrent neural network 310, a shortcut neural network 320, a future recurrent neural network 330, and a classifier 340. For each document page of the document package, the history recurrent neural network 310 is configured to generate a corresponding forward prediction, the shortcut neural network 320 is configured to generate a corresponding projection, the future recurrent neural network 330 is configured to generate a corresponding backward prediction, and the classifier 340 is configured to generate the corresponding page label.

For each document page that is not the initial page of the ordered plurality of document pages (e.g., of the document package), the history recurrent neural network 310 is configured to generate the corresponding forward prediction based on the embedding of the document page and on at least one past embedding, where each of the at least one past embedding is the embedding of a document page that precedes the document page in the document package. For the initial page of the ordered plurality of document pages (e.g., of the document package), the history recurrent neural network 310 may be configured to generate the corresponding forward prediction based on the embedding of the document page. The history recurrent neural network 310 may be implemented, for example, as a long short-term memory (LSTM) network.

In the particular example shown in FIG. 3, the history recurrent neural network 310 is configured to generate the forward prediction for the i-th document page based on the page embeddings of the document pages from the initial page of the document package (PAGE_EMBEDDING_1) to the current page (PAGE_EMBEDDING_I). In another example, the history recurrent neural network 310 may be configured to generate each forward prediction based on the past embeddings within a window of a predefined maximum length p (e.g., the embeddings of the p document pages that precede the document page in the document package), where the value of p is, for example, three, five, or ten.

For each document page of the document package, the shortcut neural network 320 is configured to process the page embedding of the document page to generate a corresponding projection of the page embedding (e.g., to a vector space of lower dimension than the page embedding space). The shortcut neural network 320 may be implemented, for example, as a fully connected neural network.

For each document page that is not the final page of the ordered plurality of document pages (e.g., of the document package), the future recurrent neural network 330 is configured to generate the corresponding backward prediction based on the embedding of the document page and on at least one future embedding. Each of the at least one future embedding is the embedding of a document page that follows the document page in the document package. For the final page of the ordered plurality of document pages (e.g., of the document package), the future recurrent neural network 330 may be configured to generate the corresponding backward prediction based on the embedding of the document page. The future recurrent neural network 330 may be implemented, for example, as an LSTM network.

In the particular example shown in FIG. 3, the future recurrent neural network 330 is configured to generate the backward prediction for the i-th document page based on the page embeddings of the document pages from the current page (PAGE_EMBEDDING_I) to the final page of the document package (PAGE_EMBEDDING_N). In another example, the future recurrent neural network 330 may be configured to generate each backward prediction based on the future embeddings within a window of a predefined maximum length q (e.g., the embeddings of the q document pages that follow the document page in the document package), where the value of q is, for example, three, five, or ten.

It is noted that embodiments of the past recurrent neural network 310 in which the forward predictions are as described above but are not based on the embedding of the current document page, and embodiments of the future recurrent neural network 330 in which the backward predictions are as described above but are not based on the embedding of the current document page, are also contemplated. Such embodiments may be configured to handle the initial and/or final pages of the ordered plurality of document pages (e.g., of the document package) as exceptions.

The classifier 340 is configured to generate, for each document page of the ordered plurality of document pages, a corresponding page label that indicates whether the document page is a document first page (e.g., the first page of the corresponding document in the document package). As shown in FIG. 3, the classifier 340 may be configured to generate each page label based on a forward prediction, a projection, and a backward prediction of the corresponding document page (as generated, e.g., by networks 310, 320, and 330, respectively). For example, the classifier 340 may be configured to generate each page label based on a combination (e.g., a concatenation) of the forward prediction, the projection, and the backward prediction of the corresponding document page.

The classifier 340 may be configured to generate the label as a class prediction. For example, the classifier 340 may be configured to generate the label to have a value between 0 and 1 that indicates the model confidence that the corresponding page embedding embeds a document first page (e.g., a value of 1 indicating the highest confidence). The classifier 340 may be implemented, for example, as a binary classifier. The classifier 340 may be configured to generate the labels as a sequence (e.g., a vector) of class predictions that has a length equal to the number of document pages in the document package, where each element of the sequence is the label of the corresponding document page in the document package.

Potential advantages of a bidirectional approach (e.g., as described with reference to FIG. 3) may be appreciated in comparison with an approach such as a page-wise binary classification, in which an embedding generated from a single page is assumed to have enough discriminative information that can be captured by a single classifier to predict whether a page is a document first page or not. Such a formulation would be rather limited, because the single classifier does not incorporate any information from preceding or following pages. A sequence-labeling approach as described herein uses recurrent neural networks instead to estimate an intermediate learned representation that captures pages (e.g., all pages) preceding and following the page under consideration as shown in FIG. 3. For example, each classification value may be based on the current input and all the previous inputs. The resulting decision made for a particular page is richer, as it is based on multiple pages (possibly every page) of the document package. In one example, an approach as described herein was used to achieve an accuracy of over 97% with a dataset of 50K documents.

Figure 4A:
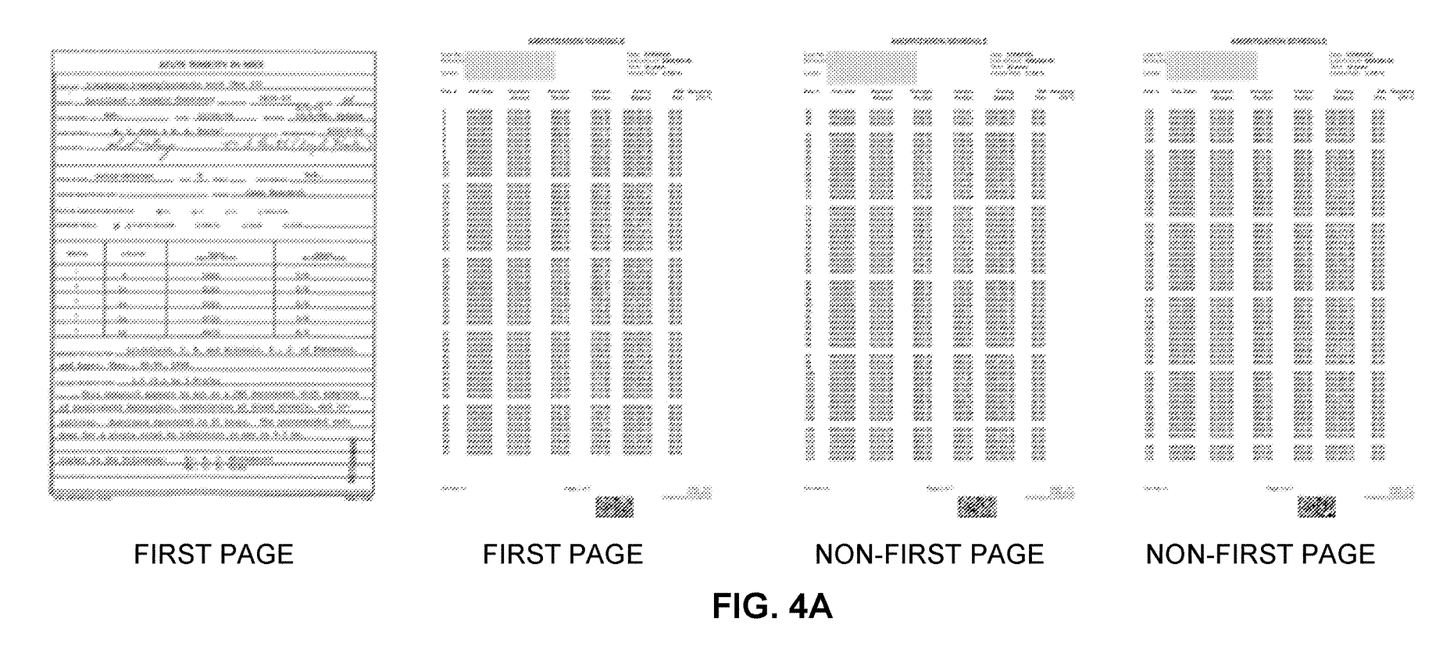
FIG. 4A illustrates an example of a sequence of pages with ground-truth labels, according to certain aspects of the present disclosure.

FIG. 4A illustrates an example in which making a labeling decision based only on the current page can be detrimental. This figure shows a one-page document followed by the first three pages of an amortization schedule, with the ground-truth labels appearing below each page. It may be seen that the pages of the amortization schedule are almost identical, such that their differences are unlikely to be captured by the learned representations resulting from language models or convolutional networks. As a result, a well generalizing robust binary classifier would be likely to classify the first page of the amortization schedule incorrectly as a non-first page, because during training the classifier has seen this particular page more often as a non-first page. In contrast, a sequence classifier as described herein will have no issue learning a rule that might be loosely formulated as: "For an amortization schedule, the optimal decision is to identify the first page of almost identical pages as a document first page and to identify the others as non-first pages."

Figure 4B:
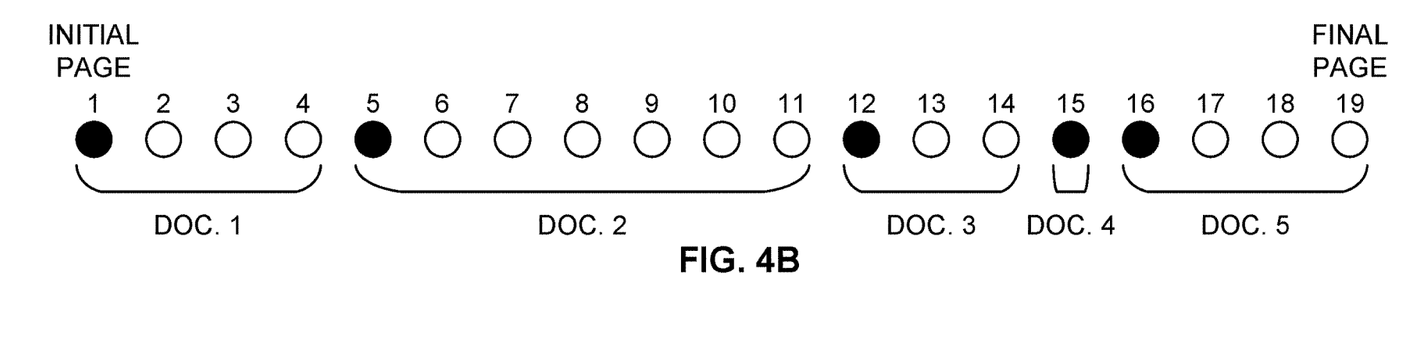
FIG. 4B shows a representation of page labels for the pages of a document package, according to certain aspects of the present disclosure.

The labels for the document pages indicate a division of the ordered plurality of document pages into a plurality of component documents. Within the sequence of labeled pages of a document package, for example, the pages labeled as "document first page" serve as delimiters that divide the document package into individual documents. FIG. 4B shows an explanatory diagram in which each circle in the ordered sequence of nineteen circles represents a corresponding page of a document package. In this diagram, the filled circles indicate pages that have been labeled (e.g., by the page labeling module 130) as "document first page" and the open circles indicate pages that have been labeled as "non-first page." FIG. 4B also shows a division of the document package into individual delimited documents, as indicated by adjacent pairs of pages labeled as "document first page."

Figure 5:
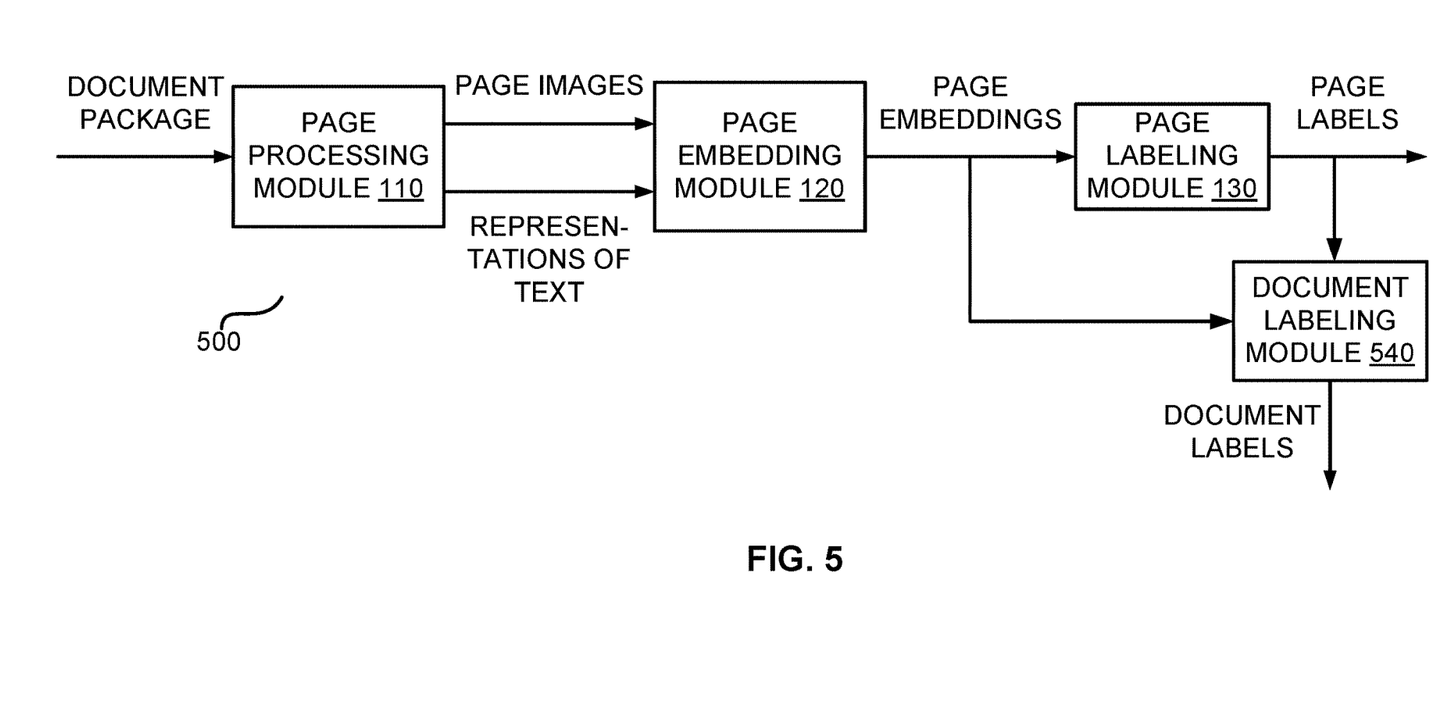
FIG. 5 shows a block diagram of another implementation of the document package processing system, according to certain aspects of the present disclosure.

FIG. 5 shows a block diagram of an implementation 500 of the document package processing system 100, according to certain aspects of the present disclosure. In this example, system 500 further includes a document labeling module 540 configured to generate document labels for documents as delimited by the page labels. The document labeling module 540 may be configured to generate a document label for a delimited document based on, for example, the page embeddings of the document. For example, the document labeling module 540 may be configured to classify a delimited document (e.g., as indicated by an adjacent pair of "document first page" labels), based on page embeddings generated by the page embedding module 130 and on page labels generated by the page labeling module 140, into one of the n different document types on which a model of the document labeling module 540 has been trained. Documents corresponding to such document types may also be referred to as "relevant documents."

The document labels generated by the document labeling module 540 may be used to identify a subset of relevant documents within the document package. The document types may include, for example: security instrument, driver's license, amortization schedule, sales contract, etc. A document package may include document types that are relevant to a particular application (e.g., document types that are likely to be included within a particular group of document packages to be processed), such as, for example, automobile insurance.

Figure 6:
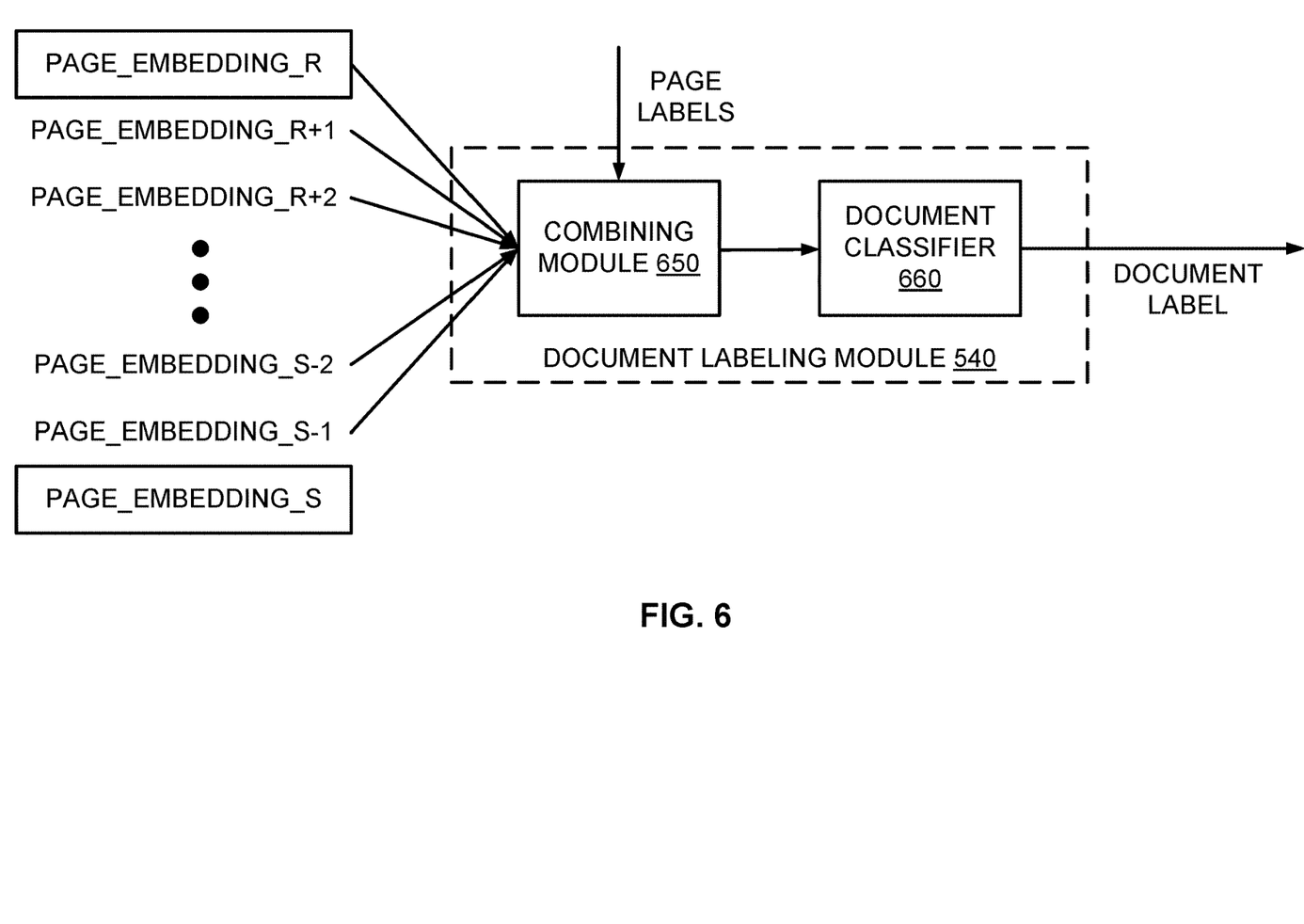
FIG. 6 shows a block diagram of an example of a document labeling module, according to certain aspects of the present disclosure.

FIG. 6 shows a block diagram of an example of the document labeling module 540, according to certain aspects of the present disclosure, that includes a combining module 650 and a document classifier 660. The combining module 650 is configured to process the page embeddings of the pages of a delimited document to generate an aggregate of the page embeddings. In the example of FIG. 6, the page labels of the r-th through s-th pages of the document package (0<r<s) indicate that the r-th and s-th pages are adjacent document first pages within the package. The page labels of the r-th and s-th pages thus delimit a document that begins with the r-th page and ends with the (s–1)-th page. Based on this indication, the combining module 550 combines the page embeddings of the r-th through (s–1)-th pages to produce an aggregated embedding for the delimited document. The combining module 650 may be implemented to perform a fixed operation (e.g., pooling of the page embeddings) or to perform a trainable operation (e.g., as a recurrent or attention-based neural network).

The document classifier 660 is configured to process the aggregate of the page embeddings of the document pages of the delimited document to generate a document label for the document and may be implemented, for example, as a fully connected neural network. For example, the document classifier 660 may include a model for classifying the delimited document into one of the n different document types ('doctypes') on which the model has been trained (e.g., relevant documents). The output of the document classifier 660 for each delimited document may be a vector of length n with values ranging from 0 to 1, representing the corresponding probability. The index of the maximum value of this vector provides the predicted document type, or indicates whether the document is not among the documents to be identified.

In an example, one or more (possibly all) of processes of the document package processing system 100 or 500 may be performed as microservices of a remote or cloud computing system, or may be implemented in one or more containerized applications on a distributed system (e.g., using a container orchestrator, such as Kubernetes). Additionally or alternatively, one or more (possibly all) of the processes of the document package processing system 100 or 500 may be performed locally as modules running on a computing platform associated with the document package processing system 100. In either case, such a system or platform may include multiple processing devices (e.g., multiple computing devices) that collectively perform the process. In some examples, the document package processing system 100 or 500 may be accessed through a detection application programming interface (API). The detection API may be deployed as a gateway to a microservice or a Kubernetes system on which the processes of the document package processing system 100 or 500 may be performed. The microservice or Kubernetes system may provide computing power to serve large scale document processing operations.

Figure 7:
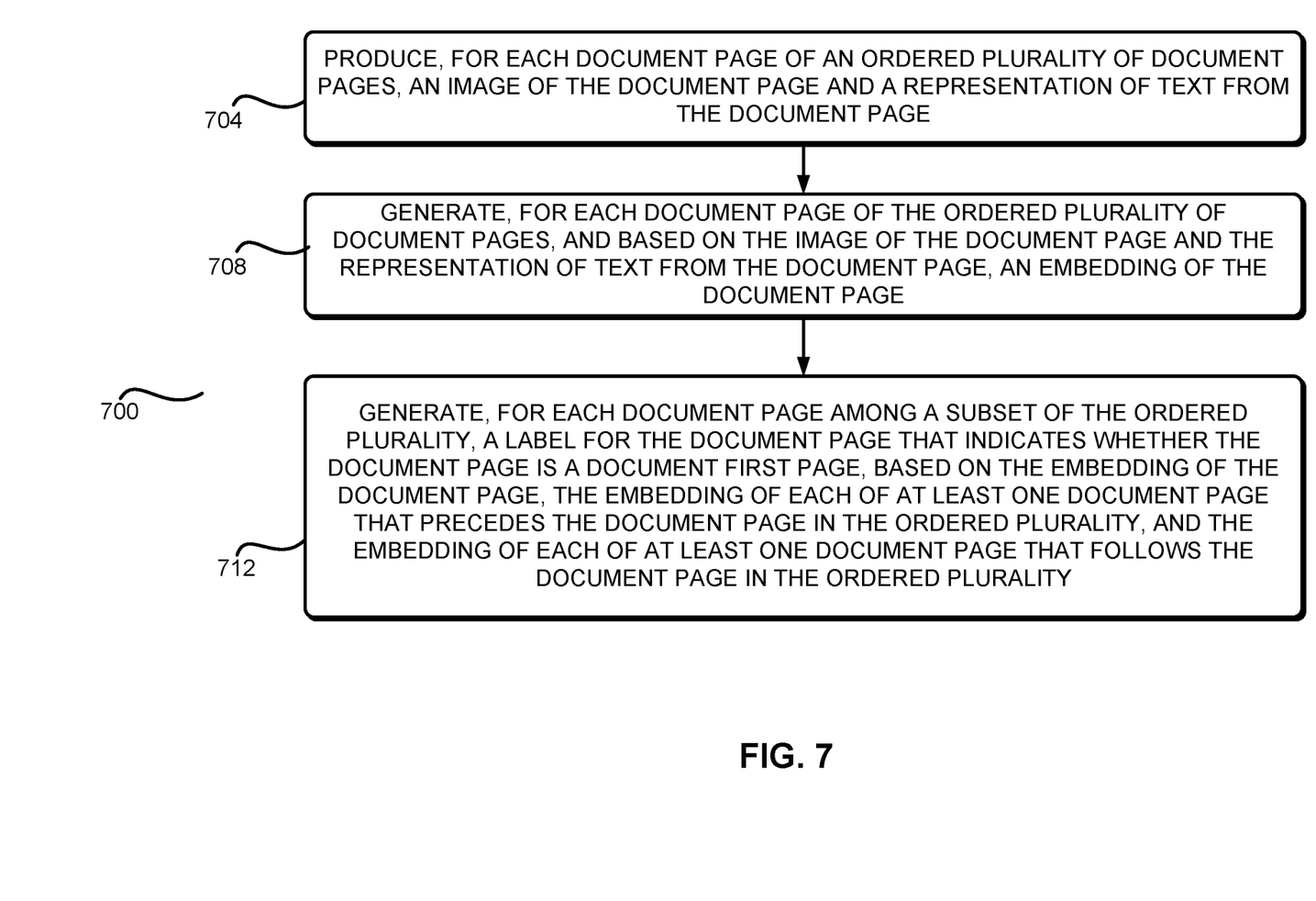
FIG. 7 shows a flowchart of a process of document package processing, according to certain aspects of the present disclosure.

FIG. 7 depicts an example of a process 700 of document package processing (e.g., automated package splitting), according to certain embodiments of the present disclosure. One or more processing devices (e.g., one or more computing devices) implement operations depicted in FIG. 7 by executing suitable program code. For example, process 700 may be executed by an instance of the document package processing system 100 or 500. For illustrative purposes, the process 700 is described with reference to certain examples depicted in the figures. Other implementations, however, are possible.

Process 700 may be executed for an ordered plurality of document pages of a document package. At block 704, the process involves producing (e.g., by a page processing module as described herein), for each document page of an ordered plurality of document pages, an image of the document page and a representation of text from the document page.

At block 708, the process involves generating (e.g., by a page embedding module as described herein), for each document page of the ordered plurality, and based on the image of the document page and the representation of text from the document page, an embedding of the document page. In some examples, generating the embedding of a document page is based on an embedding of a context of recognized words from the document page. Alternatively or additionally, generating the embedding of a document page may be based on a graph of word bounding boxes in the page. Alternatively or additionally, generating the embedding of a document page may be is based on an embedding of a formatting of text within the document page. Alternatively or additionally, generating the embedding of a document page may be based on a statistical distribution of pixel values of the image of the document page.

At block 712, the process involves generating (e.g., by a page labeling module as described herein), for each document page among a subset of the ordered plurality (e.g., excluding the initial and final pages), a label for the document page that indicates whether the document page is a document first page. For each document page among the subset of the ordered plurality, generating the label for the document page is based on the embedding of the document page, the embedding of each of at least one document page that precedes the document page in the ordered plurality, and the embedding of each of at least one document page that follows the document page in the ordered plurality.

In some examples, generating the label for each document page is based on the embedding of each of a plurality of document pages that precede the document page in the document package, and on the embedding of each of a plurality of document pages that follow the document page in the document package. Generating the label for a document page may include generating, by a first recurrent neural network and based on the embedding of each of the at least one document page that precedes the document page in the ordered plurality of document pages, a backward prediction and generating, by a second recurrent neural network and based on the embedding of each of the at least one document page that follows the document page in the ordered plurality of document pages, wherein the label is based on the backward prediction and on the forward prediction. The labels for the document pages among the subset of the ordered plurality of document pages may indicate a division of the ordered plurality of document pages into a plurality of individual documents, and the process may further comprise, for each of the plurality of individual documents, classifying the document (e.g., by a document labeling module as described herein) based on the page embeddings of document pages of the document.

Figure 8:
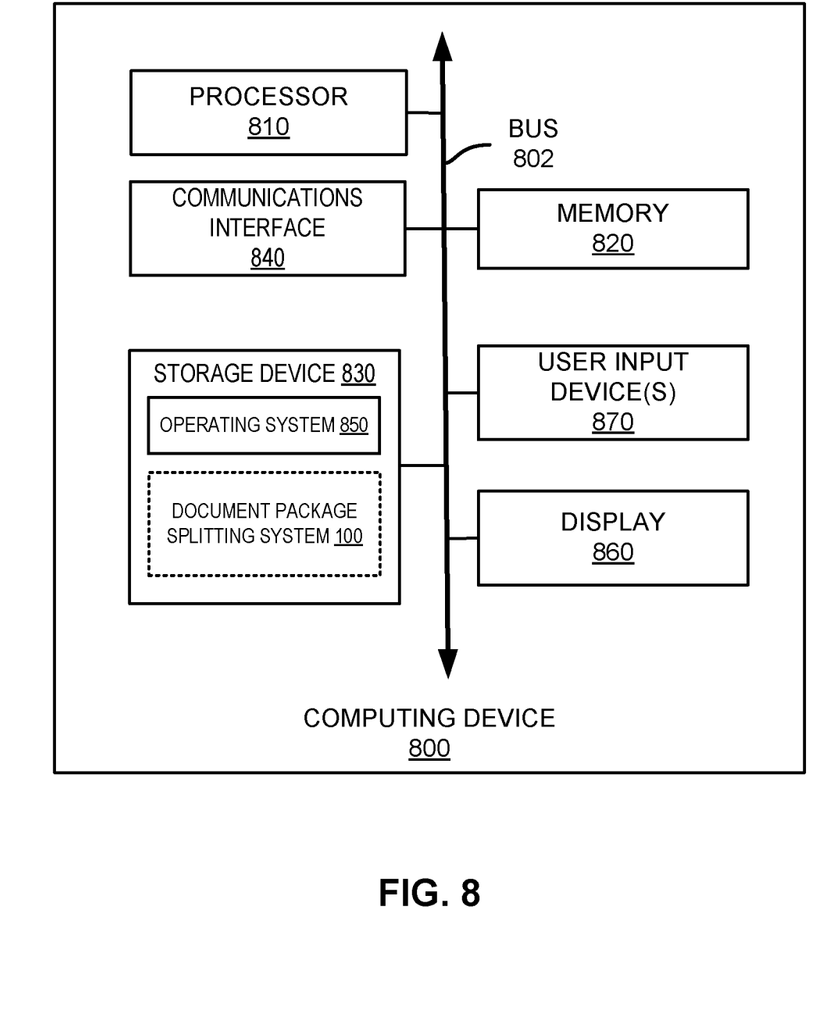
FIG. 8 shows a block diagram of an example computing device, according to certain aspects of the present disclosure.

FIG. 8 shows an example computing device 800 suitable for implementing aspects of the techniques and technologies presented herein. The example computing device 800 includes a processor 810 which is in communication with a memory 820 and other components of the computing device 800 using one or more communications buses 802. The processor 810 is configured to execute processor-executable instructions stored in the memory 820 to perform secure data protection and recovery according to different examples, such as part or all of the example process 700 or other processes described above with respect to FIGS. 1-7. In an example, the memory 820 is a non-transitory computer-readable medium that is capable of storing the processor-executable instructions. The computing device 800, in this example, also includes one or more user input devices 870, such as a keyboard, mouse, touchscreen, microphone, etc., to accept user input. The computing device 800 also includes a display 860 to provide visual output to a user. In other examples of a computing device (e.g., a device within a cloud computing system), such user interface devices may be absent.

The computing device 800 can also include or be connected to one or more storage devices 830 that provides non-volatile storage for the computing device 800. The storage devices 830 can store an operating system 850 utilized to control the operation of the computing device 800. The storage devices 830 can also store other system or application programs and data utilized by the computing device 800, such as modules implementing the functionalities provided by the document package splitting system 100 or any other functionalities described above with respect to FIGS. 1-7. The storage devices 830 might also store other programs and data not specifically identified herein.

The computing device 800 can include a communications interface 840. In some examples, the communications interface 840 may enable communications using one or more networks, including: a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate arrays (FPGAs) specifically, to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media (for example, computer-readable storage media) that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C. For the purposes of the present document, the phrase "A is based on B" means "A is based on at least B".

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

The invention claimed is:

1. A computer-implemented method for processing an ordered plurality of document pages, the method comprising:
   producing, for each document page of the ordered plurality of document pages, an image of the document page and a representation of text from the document page;
   generating, for each document page of the ordered plurality of document pages, and based on the image of the document page and the representation of text from the document page, an embedding of the document page; and
   generating, for each document page among a subset of the ordered plurality of document pages, a label for the document page that indicates whether the document page is a document first page,
   wherein, for each document page among the subset of the ordered plurality of document pages, generating the label for the document page is based on the embedding of the document page, the embedding of each of at least one document page that precedes the document page in the ordered plurality of document pages, and the embedding of each of at least one document page that follows the document page in the ordered plurality of document pages.

2. The computer-implemented method of claim 1, wherein the subset of the ordered plurality of document pages does not include an initial page of the ordered plurality of document pages and does not include a final page of the ordered plurality of document pages.

3. The computer-implemented method of claim 1, wherein, for each document page among the subset of the ordered plurality of document pages, generating the label for the document page is based on:
   the embedding of each of a plurality of document pages that precede the document page in a document package, and
   the embedding of each of a plurality of document pages that follow the document page in the document package.

4. The computer-implemented method of claim 1, wherein generating, for each document page of the ordered plurality of document pages, the embedding of the document page is based on an embedding of a context of recognized words from the document page.

5. The computer-implemented method of claim 1, wherein generating, for each document page of the ordered plurality of document pages, the embedding of the document page is based on a graph of word bounding boxes in the page.

6. The computer-implemented method of claim 1, wherein generating, for each document page of the ordered plurality of document pages, the embedding of the document page is based on an embedding of a formatting of text within the document page.

7. The computer-implemented method of claim 1, wherein generating, for each document page of the ordered plurality of document pages, the embedding of the document page is based on a statistical distribution of pixel values of the image of the document page.

8. The computer-implemented method of claim 1, wherein generating the label for the document page includes:
- generating, by a first recurrent neural network and based on the embedding of each of the at least one document page that precedes the document page in the ordered plurality of document pages, a backward prediction; and
- generating, by a second recurrent neural network and based on the embedding of each of the at least one document page that follows the document page in the ordered plurality of document pages, and
- wherein the label is based on the backward prediction and on a forward prediction.

9. The computer-implemented method of claim 1, wherein generating, for each document page among the subset of the ordered plurality of document pages, the label for the document page comprises generating a vector, each element of the vector corresponding to a respective document page in the ordered plurality and indicating the label of the document page.

10. The computer-implemented method of claim 1, wherein the labels for the document pages among the subset of the ordered plurality of document pages indicate a division of the ordered plurality of document pages into a plurality of individual documents.

11. The computer-implemented method of claim 10, wherein the method further comprises, for each of the plurality of individual documents, classifying the document based on the page embeddings of document pages of the document.

12. The computer-implemented method of claim 1, the method further comprising, based on the page embeddings of the document pages of the ordered plurality of document pages and on the labels for the document pages among the subset of the ordered plurality of document pages, classifying each of a plurality of documents within the ordered plurality of document pages.

13. A document package processing system, the system comprising:
- one or more processing devices; and
- one or more non-transitory computer-readable media communicatively coupled to the one or more processing devices, wherein the one or more processing devices are configured to execute program code stored in the non-transitory computer-readable media and thereby perform operations for processing an ordered plurality of document pages, the operations comprising:
  - producing, for each document page of the ordered plurality of document pages, an image of the document page and a representation of text from the document page;
  - generating, for each document page of the ordered plurality of document pages, and based on the image of the document page and the representation of text from the document page, an embedding of the document page; and
  - generating, for each document page among a subset of the ordered plurality of document pages, a label for the document page that indicates whether the document page is a document first page,
  - wherein, for each document page among the subset of the ordered plurality of document pages, generating the label for the document page is based on the embedding of the document page, the embedding of each of at least one document page that precedes the document page in the ordered plurality of document pages, and the embedding of each of at least one document page that follows the document page in the ordered plurality of document pages.

14. The document package processing system of claim 13, wherein, for each document page among the subset of the ordered plurality of document pages, generating the label for the document page is based on:
- the embedding of each of a plurality of document pages that precede the document page in a document package, and
- the embedding of each of a plurality of document pages that follow the document page in the document package.

15. The document package processing system of claim 13, wherein generating, for each document page of the ordered plurality of document pages, the embedding of the document page is based on a graph of word bounding boxes in the page.

16. The document package processing system of claim 13, wherein generating the label for the document page includes:
- generating, by a first recurrent neural network and based on the embedding of each of the at least one document page that precedes the document page in the ordered plurality of document pages, a backward prediction; and
- generating, by a second recurrent neural network and based on the embedding of each of the at least one document page that follows the document page in the ordered plurality of document pages, and
- wherein the label is based on the backward prediction and on a forward prediction.

17. The document package processing system of claim 13, wherein the labels for the document pages among the subset of the ordered plurality of document pages indicate a division of the ordered plurality of document pages into a plurality of individual documents.

18. The document package processing system of claim 17, wherein the operations further comprise, for each of the plurality of individual documents, classifying the document based on the page embeddings of document pages of the document.

19. One or more non-transitory computer-readable media storing computer-executable instructions to cause a computer to perform operations for processing an ordered plurality of document pages, the operations comprising:
- producing, for each document page of the ordered plurality of document pages, an image of the document page and a representation of text from the document page;
- generating, for each document page of the ordered plurality of document pages, and based on the image of the document page and the representation of text from the document page, an embedding of the document page; and
- generating, for each document page among a subset of the ordered plurality of document pages, a label for the document page that indicates whether the document page is a document first page,
- wherein, for each document page among the subset of the ordered plurality of document pages, generating the label for the document page is based on the embedding of the document page, the embedding of each of at least one document page that precedes the document page in the ordered plurality of document pages, and the embedding of each of at least one document page that follows the document page in the ordered plurality of document pages.

20. The one or more non-transitory computer-readable media of claim 19, the operations further comprising, based on the page embeddings of the document pages of the ordered plurality of document pages and on the labels for the document pages among the subset of the ordered plurality of document pages, classifying each of a plurality of documents within the ordered plurality of document pages.

* * * * *